(12) United States Patent
Ohki

(10) Patent No.: US 8,594,316 B2
(45) Date of Patent: Nov. 26, 2013

(54) VOICE CALL SYSTEM ADAPTED TO SUPPORT A COMPUTER TERMINAL AND THAT ADJUSTS A RINGER TONE

(75) Inventor: Yasuomi Ohki, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1977 days.

(21) Appl. No.: 11/510,640

(22) Filed: Aug. 28, 2006

(65) Prior Publication Data

US 2007/0047724 A1    Mar. 1, 2007

(30) Foreign Application Priority Data

Aug. 29, 2005   (JP) ................................. 2005-247521

(51) Int. Cl.
*H04M 3/00* (2006.01)
*H04M 1/00* (2006.01)

(52) U.S. Cl.
USPC ...................................... 379/373.01; 379/421

(58) Field of Classification Search
USPC ............ 379/373, 374, 375, 376.02, 352, 388, 379/390.01, 390.03, 392.01, 395, 420, 372, 379/375.01, 376, 421, 424; 370/352, 353, 370/354, 355, 356, 357; 455/567
See application file for complete search history.

(56) References Cited

U.S. PATENT DOCUMENTS

| 4,947,421 | A | * | 8/1990 | Toy et al. ...................... 379/67.1 |
| 5,191,607 | A | * | 3/1993 | Meyers et al. ................. 379/421 |
| 5,448,620 | A | * | 9/1995 | Gershkovich et al. ..... 455/552.1 |
| 5,987,106 | A | * | 11/1999 | Kitamura .................. 379/110.01 |
| 6,002,763 | A | * | 12/1999 | Lester et al. ................... 379/421 |
| 6,006,114 | A | * | 12/1999 | Seppanen et al. ............. 455/567 |
| 6,597,687 | B1 | * | 7/2003 | Rao ................................ 370/352 |
| 2001/0033647 | A1 | * | 10/2001 | Veschi .......................... 379/372 |
| 2001/0040960 | A1 | * | 11/2001 | Hamami et al. ............... 379/352 |
| 2002/0106074 | A1 | * | 8/2002 | Elliott .......................... 379/372 |
| 2003/0026416 | A1 | * | 2/2003 | Fusco ....................... 379/374.02 |
| 2004/0091090 | A1 | * | 5/2004 | Hong et al. .............. 379/102.03 |
| 2004/0106432 | A1 | * | 6/2004 | Kanamori et al. ......... 455/556.1 |
| 2004/0128144 | A1 | * | 7/2004 | Johnson et al. ............... 704/278 |
| 2004/0131174 | A1 | * | 7/2004 | Lucey et al. ............. 379/373.01 |
| 2004/0161083 | A1 | * | 8/2004 | Crockett et al. ........... 379/93.23 |
| 2004/0266488 | A1 | * | 12/2004 | Ghomeshi et al. ............ 455/567 |
| 2005/0168333 | A1 | * | 8/2005 | Cronin ......................... 340/501 |

(Continued)

FOREIGN PATENT DOCUMENTS

| JP | 58-062956 | 4/1983 |
| JP | 10-108256 | 4/1998 |

(Continued)

*Primary Examiner* — Mohammad Islam
*Assistant Examiner* — Kharye Pope
(74) *Attorney, Agent, or Firm* — Young & Thompson

(57) ABSTRACT

A ringer tone signal is attenuated, during a state in which a call is in progress, below the ringer tone signal level that occurs when no call is in progress, when a PC terminal is utilized as a telephone. A voice call system includes a handset unit for making a call, and a hook switch detection unit for detecting an on-hook/off-hook state of the handset unit. The PC terminal includes a sound source interface unit connected to a sound source, a fixed storage device for storing setting data indicative of a sound source for making a voice call, and a communication control unit responsive to a ringer tone generating operation command issued by the voice exchanger for determining whether or not a call is in progress from an on-hook/off-hook state detected by the hook switch detection unit.

20 Claims, 14 Drawing Sheets

(56) References Cited

U.S. PATENT DOCUMENTS

2005/0282590 A1* 12/2005 Haparnas ................. 455/570
2006/0072548 A1*  4/2006 Mundra et al. ............ 370/352
2006/0114891 A1*  6/2006 Uto et al. ................. 370/356
2006/0193459 A1*  8/2006 Cadiz et al. .............. 379/211.02
2006/0268836 A1* 11/2006 Prentice .................. 370/352
2007/0025335 A1*  2/2007 Patel et al. ............... 370/352

FOREIGN PATENT DOCUMENTS

| | | |
|---|---|---|
| JP | 2000-209306 | 7/2000 |
| JP | 2003-115901 | 4/2003 |
| JP | 2004-146934 | 5/2004 |
| JP | 2005-45742 | 2/2005 |
| JP | 2005-244327 | 9/2005 |

* cited by examiner

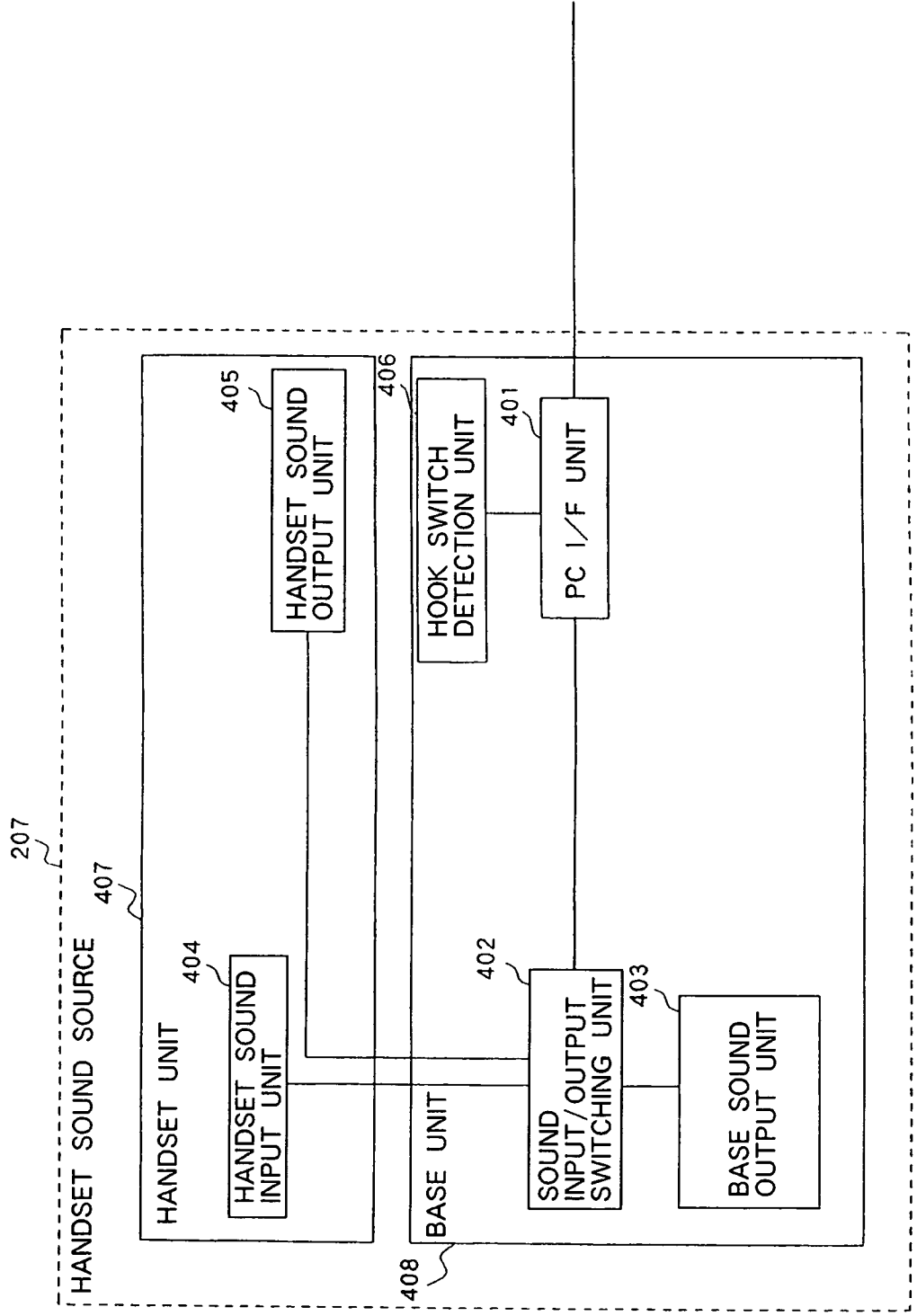

Fig.5

| HANDSET HOOK STATE 501 | HANDSET DESTINATION STATE 502 | EXCHANGER CALLING STATE 503 | VOICE DATA TRANSMISSION /RECEPTION STATE 504 | IN-SERVICE RINGER TONE VOLUME SETTING 505 | IN-SERVICE OS/ APPLICATION VOLUME SETTING 506 | CALL SOUND SOURCE SETTING 507 | RINGER TONE SOURCE SETTING 508 |
|---|---|---|---|---|---|---|---|
| EXAMPLE: ON-HOOK | EXAMPLE: HANDSET UNIT | EXAMPLE: CALL IN PROGRESS | EXAMPLE: TRANSMISSION /RECEPTION IN PROGRESS | EXAMPLE: -5dB | EXAMPLE: -10dB | EXAMPLE: HANDSET SOUND SOURCE | EXAMPLE: SOUND SOURCE 2 |

VOICE CALL SYSTEM ADAPTED TO SUPPORT A COMPUTER TERMINAL AND THAT ADJUSTS A RINGER TONE

BACKGROUND OF THE INVENTION

1. Field of the Invention

The present invention relates to a voice call system for making a call between terminals, and more particularly, to a voice call system which employs a personal computer terminal (hereinafter called the "PC terminal").

2. Description of the Related Art

The following voice call systems are enumerated as proposing new ideas in transmission of a ringer tone to a receiving terminal during a telephone conversation.

JP-A-58-62956 and JP-A-10-108256 disclose that a ringer tone signal is attenuated in a calling state to a level lower than that in a non-calling state.

The foregoing JP-A-58-62956 relates to a push button telephone, while JP-A-10-108256 relates to a portable telephone. Additionally, in recent years, many voice call systems utilize PC terminals as telephones.

In a voice call system which utilizes PC terminals as telephones, a ringer tone required by the voice call system, and sound used by an operating system (OS) or by other applications (hereinafter abbreviated as "OS system sound") are generated by using a sound source equipped in the PC terminals.

For the voice call system which utilizes PC terminals as telephones, it is also desirable to attenuate a ringer tone signal during a calling state to a level lower than that during a non-calling state, however, a PC terminal may be connected with one or a plurality of sound sources, and they can be frequently plugged into and unplugged from the PC terminal through external terminals such as USB terminals. This makes it difficult to identify from which sound source a ringer tone or OS system sound is generated, so that conventional software which implements a voice call on a PC terminal cannot decrease the volume, or turn off the volume only when such sound is generated from a sound source which is being used in a call. While it is contemplated that such control is conducted from an exchanger, uniform control from the exchanger is difficult because it cannot correctly keep track of situations in which the sound sources are placed in the PC terminal in real time, thus giving rise to the problem in which a ringer tone that is generated from a speaker, associated with a sound source that is being used for the call will interfere with the call, or that, on the contrary, no ringer tone is generated even when there is an incoming call during a conversation, so that the called party is not aware of the incoming call.

Also, when a sound source is shared by OS system sound, voice call, and ringer tone due to a PC terminal having only one sound source, or the like, the OS system sound generated during a conversation may interfere with the conversation. In this even, the volume of OS sound can be set only by the sound source in many cases, so that if there is only one sound source available, it is difficult to decrease only the OS system sound. Also, since the absence of the OS system sound is inconvenient when a call is in progress, the foregoing problem cannot be solved by setting the volume of the OS system sound.

SUMMARY OF THE INVENTION

The present invention has been made in view of the problems experienced by the prior art as described above, and it is an object of the present invention to automatically determine, upon generation of a ringer tone whether, except for a sound source, there is a ringer tone source for calling, to avoid generating ring tone, or to generate a ringer tone after its volume has been decreased during a conversation when there is no sound source dedicated to the ringer tone, to generate the ringer tone during a conversation from a separate ringer tone source, if any, to restrain OS system sound or decrease only the volume thereof during a conversation, and to generate the OS system sound at a normal volume when no call is in progress, thereby accomplishing attenuation of the ringer tone signal during a calling state to a level lower than that of the ringer tone signal during a non-calling state even in a voice call system which utilizes a PC terminal as a telephone.

A voice call system according to the present invention having a PC terminal and a voice exchanger connected through a voice communications network and a voice call line, for making a voice call through the PC terminal which is controlled by the voice exchanger for reception, origination, and voice communication.

The system comprises:
a handset unit for making a call; and
a hook switch detection unit for detecting an on-hook/off-hook of the handset unit,
wherein the PC terminal comprises:
a sound source interface unit connected to a sound source;
a fixed storage device for storing setting data indicative of a sound source for use in making a voice call; and
a communication control unit responsive to a ringer tone generating operation command issued by the voice exchanger for determining whether or not a call is in progress based on the on-hook/off-hook state detected by the hook switch detection unit, for determining from contents stored in the fixed storage device whether or not a sound source for a ringer tone generating operation is the same as a call sound source, and for decreasing the volume of a ringer tone or muting the ringer tone when a call is in progress and when the sound source for the ringer tone generating operation is the same as the call sound source.

A voice call system according to another aspect of the present invention having a PC terminal and a voice exchanger connected through a voice communications network and a voice call line, for making a voice call through the PC terminal which is controlled by the voice exchanger for reception, origination, and voice communication. The system comprises:
a handset unit for making a call;
a base unit for the handset unit; and
a sound input/output switching unit for connecting sound data transmitted/received to/from a PC interface unit that is connected to the PC terminal to the handset unit or to the base unit in accordance with an on-hook/off-hook state of the handset unit,
wherein the PC terminal comprises:
a sound source interface unit connected to a sound source;
a fixed storage device for storing setting data indicative of a sound source that is used for in making a voice call; and
a communication control unit responsive to a ringer tone generating operation command issued by the voice exchanger for determining whether or not a call is in progress based on to which the sound input/output switching unit is connected, for determining based on contents stored in the fixed storage device whether a sound source for a ringer tone generating operation is the same as a call sound source, and for decreasing the volume of a ringer tone or muting the ringer tone when the sound source for the ringer tone generating operation is the same as the call sound source.

A voice call system according to a further aspect of the present invention has a PC terminal and a voice exchanger connected through a voice communications network and a voice call line, for making a voice call through the PC terminal which is controlled by the voice exchanger for reception, origination, and voice communication. The PC terminal comprises:

a sound source interface unit connected to a sound source;

a fixed storage device for storing a state during which a call is in progress, notified from the voice exchanger, and setting data indicative of a sound source for use in making a voice call; and a communication control unit responsive to a ringer tone generating operation command issued by the voice exchanger for determining from contents stored in the fixed storage device whether or not a call is in progress, and whether or not a sound source for a ringer tone generating operation is the same as a call sound source, and for decreasing the volume of a ringer tone or muting the ringer tone when a call is in progress and when the sound source for the ringer tone generating operation is the same as the call sound source.

A voice call system according to yet a further aspect of the present invention having a PC terminal and a voice exchanger connected through a voice communications network and a voice call line, for making a voice call through the PC terminal which is controlled by the voice exchanger for reception, origination, and voice communication. The PC terminal comprises:

a voice data processing unit for transmitting/receiving voice data when a voice call is made;

a sound source interface unit connected to a sound source;

a fixed storage device for storing a state during which a call is in progress, notified from the voice exchanger and setting data indicative of a sound source for use in making a voice call; and a communication control unit responsive to a ringer tone generating operation command issued by the voice exchanger for determining whether or not a call is in progress based on whether or not the voice data processing unit is transmitting/receiving voice data, and for determining whether or not a sound source for a ringer tone generating operation is the same as a call sound source, and for decreasing the volume of a ringer tone or muting the ringer tone when a call is in progress and when the sound source for ringer-tone generating operation is the same as the call sound source.

In any of the voice call systems described above, the communication control unit decreases the volume of, or mutes sound associated with an operating system of the PC terminal and sound associated with another application.

In the present invention, it is automatically determined whether a ringer tone source is provided, in addition to a call sound, source when a ringer tone is generated, and the ringer tone is muted or emitted with a decreased volume during a conversation when no ringer tone source is provided. When a separate ringer tone source is provided, the ringer tone is emitted from this sound source during a conversation.

In the present invention, OS system sound is restrained or decreased in volume during a conversation. When no call is in progress, the OS system sound is generated at a normal volume.

As described above, the present invention attenuates a ringer tone signal, during a state when a call is made, below the level of the ringer tone signal during a state when a call is made, even in a voice communication system which utilizes a PC terminal as a telephone.

BRIEF DESCRIPTION OF THE DRAWING

FIG. 4 is a block diagram illustrating the configuration of handset sound source 207 connected to PC terminal 102;

FIG. 5 is a diagram showing contents in a setting data storage area for voice call application 301, stored in fixed storage device 209 of PC terminal 102;

DETAILED DESCRIPTION OF THE PREFERRED EMBODIMENTS

Next, embodiments of the present invention will be described with reference to the drawings.

Figure 1:
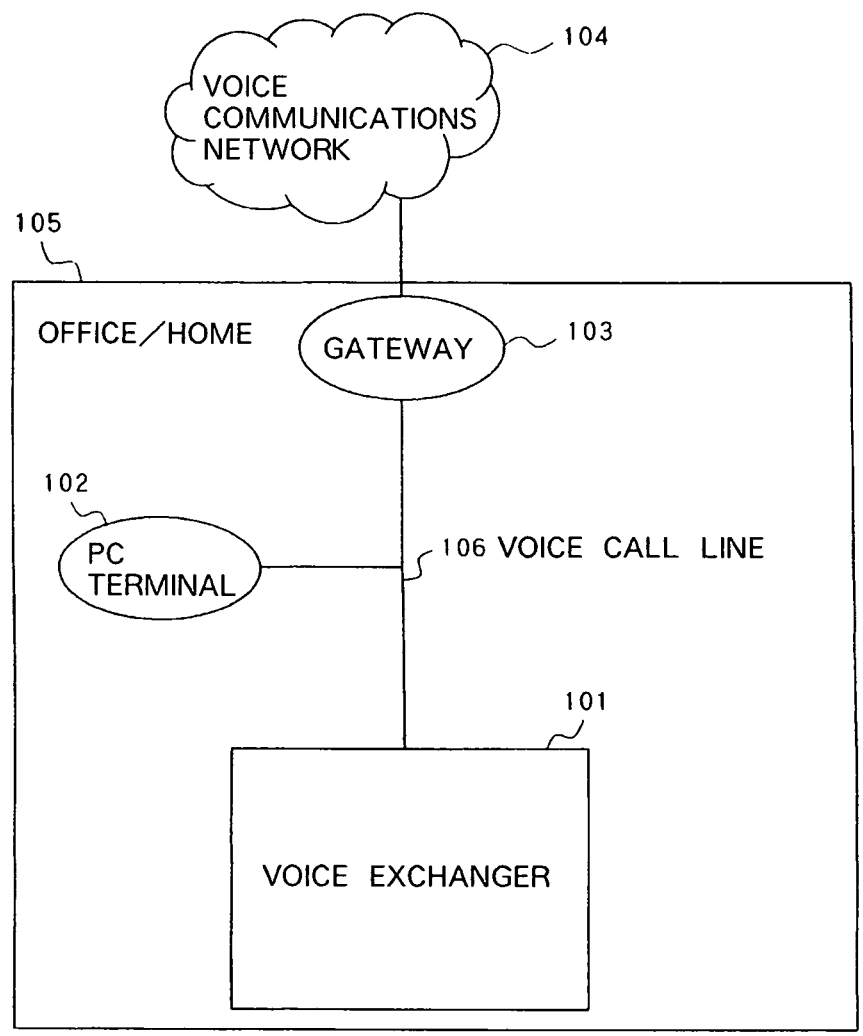
FIG. 1 is a block diagram generally illustrating the configuration of one embodiment of the present invention.

FIG. 1 is a block diagram generally illustrating the configuration according to one embodiment of the present invention, showing the configuration of office/home 105 connected to voice communications network 104.

Office/home 105 is equipped with voice exchanger 101 for exchanging voice communications; PC terminal 102 installed on a desk of an operator; and gate way 103 arranged between voice exchanger 101 and PC terminal 102 and voice communications network 104, where these components are interconnected through voice call line 106.

Voice exchanger 101 communicates with voice communications network 104 to control reception, origination, and voice communication between PC terminal 102 and voice communications network 104.

Figure 2:
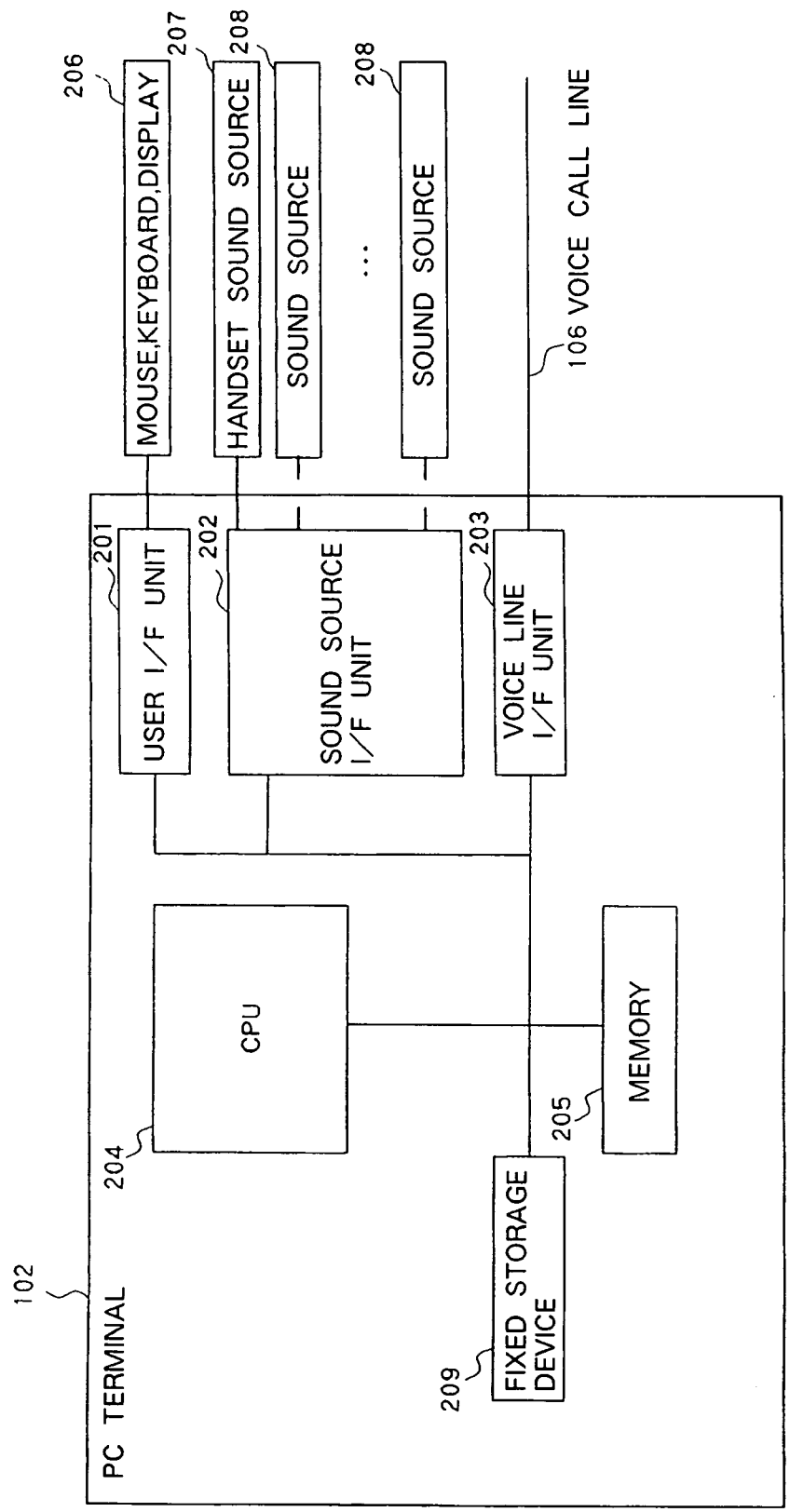
FIG. 2 is a block diagram illustrating the configuration of PC terminal 102 in FIG. 1.

FIG. 2 is a block diagram illustrating the configuration of PC terminal 102. Referring to FIG. 2, a description will be given of the configuration and operation of PC terminal 102.

PC terminal 102 comprises user I/F (interface) unit 201; sound source I/F unit 202, voice line I/F unit 203; CPU 204; memory 205; and fixed storage device 209.

User I/F unit 201 receives input signals from a mouse, a keyboard, and display 206 connected to PC terminal 102, and supplies a video signal to display 206. Sound source I/F unit 202 transmits/receives voice data to/from handset sound source 207 and a plurality of sound sources 209 connected to PC terminal 102. Voice line I/F unit 203 transmits/receives signals to/from voice call line 106. CPU 204 controls overall PC terminal 102. Memory 205 is used as a work area for using software and data required to control PC terminal 102. Fixed storage device 209 stores software and data.

Figure 3:
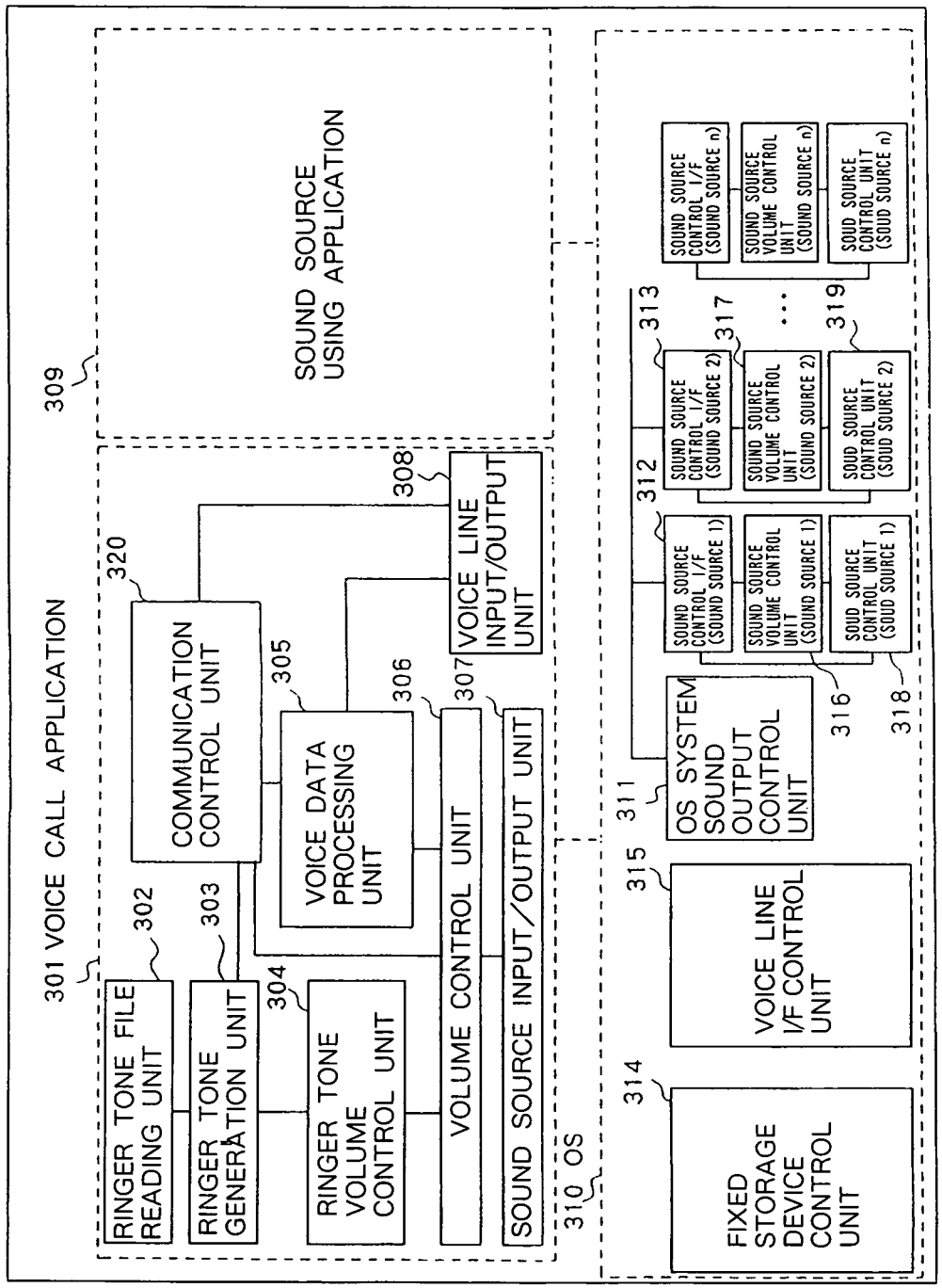
FIG. 3 is a diagram illustrating the configuration of software modules stored in memory 205 within PC terminal 102.

FIG. 3 is a diagram illustrating the configuration of software modules implemented in memory 205 within PC terminal 102. The software modules of this embodiment comprise voice call application 301, sound source using application 309, and OS 310.

Voice call application 301, which is application software running on OS 310 for making voice calls, comprises ringer tone file reading unit 302, ringer tone generation unit 303, ringer tone volume control unit 304, voice data processing unit 305, volume control unit 306, sound source input/output unit 307, voice line input/output unit 308, and communication control unit 320.

OS 301 comprises fixed storage device storage unit 314, voice line I/F control unit 315, OS system sound output control unit 311, sound source control I/F's, sound source volume control units, and sound source control units, and is installed in PC terminal 102. One set of the sound source control I/F, sound source volume control unit, and sound source control unit is provided for each sound source, and these components numbered in FIG. 3 include sound source control I/F 312, sound source volume control unit 316, and sound source control unit 318 provided for sound source 1, and sound source control I/F 313, sound source volume control unit 317, and sound source control unit 319 provided for sound source 2, but the number of these sets is as large as the number of sound sources.

Each of the foregoing modules and the respective components which form part of each of the modules are implemented in memory 205 by programs supplied from the outside, and cooperate with CPU 204 to perform a variety of control operations and processing operations. The programs may be installed in memory 205 from a storage medium such as CD-ROM, floppy disk, external memory device or the like through an interface, or may be delivered through a network, for example, the Internet.

Ringer tone file reading unit 302 reads a ringer tone waveform data file from fixed storage unit 209 through OS 310, ringer tone generation unit 303 converts the format of the read ringer tone waveform data such that it can be reproduced on OS 310, and ringer tone volume control unit 304 increases or decreases the volume of the converted ringer tone data based on a previously set value.

Voice data processing unit 305 receives voice communication data acquired by voice line input/output unit 308 from a voice line through OS 310, converts the format of the voice communication data such that it can be reproduced on OS 310, and passes the converted data to volume control unit 306. Voice data processing unit 305 also receives, through volume control unit 306, voice input waveform data from a sound source received by sound source input/output unit 307 through OS 310, and passes the data to voice line input/output unit 308.

Volume control unit 306 increases or decreases the volume of sound waveform data received from ringer tone volume control unit 304 and voice data processing unit 305, based on a previously set value, and passes the resulting sound waveform data to sound source input/output unit 307. Volume control unit 306 also receives a voice input waveform, from a sound source from sound source input/output unit 307 through OS 310, increases or decreases the volume of the voice input waveform based on a previously set value, and passes the resulting data to voice data processing unit 305.

Sound source input/output unit 307 receives the microphone input waveform of a sound source from the sound source control I/F of OS 310, and passes the microphone input waveform to volume control unit 306. Sound source input/output unit 307 also passes sound waveform data received from volume control unit 306 to the sound source control I/F of OS 310.

Voice line input/output unit 308 converts the format of voice waveform data received from voice data processing unit 305 for voice communication, and sends the converted data to voice call line 106. Voice line input/output unit 308 also converts the format of voice communication data received from voice communication line 106 such that the data can be reproduced on OS 310, and passes the converted data to voice data processing unit 305.

Sound source using application 309 represents any application which uses a sound source, other than voice call application 301, that runs on PC terminal 102.

OS system sound output control unit 311 generates system sound such as alarm sound, confirmation sound and the like associated with OS 310, and sends the system sound to a sound source which has been set to reproduce the system sound.

Each sound control I/F 312, 313 is an I/F for an application on OS 310 for controlling each sound source.

Fixed storage device control unit 314 reads and writes data from/into fixed storage device 209 of PC terminal 102 in response to instructions of an application or OS 310.

Voice line I/F control unit 315 transmits/receives data to/from voice line I/F unit 203 of PC terminal 102 in response to instructions of an application or OS 310.

Each sound source volume control unit 316, 317 increases or decreases the volume of input/output sound waveform data for each sound source in accordance with a value indicated by OS 310.

Each sound source control unit 318, 319 receives/delivers data to/from a sound source connected to PC terminal 102 through sound source I/F unit 202.

Communication control unit 320 transmits/receives voice communication control signals to/from voice call line 106, and controls sound sources through sound source control I/F's 312, 313.

FIG. 4 is a block diagram illustrating the configuration of handset sound source 207 connected to PC terminal 102. Handset sound source 207 comprises handset unit 407 and base unit 408, where handset unit 407 comprises handset sound input unit 404 and handset sound output unit 405, while base unit 408 comprises PC I/F unit 401, sound input/output switching unit 402, base sound output unit 403, and hook switch detection unit 406.

PC I/F unit 401 is connected to sound source I/F unit 202 of PC terminal 102 for transmitting/receiving data to/from PC terminal 102.

Sound input/output switching unit 402 switches depending on whether voice data transmitted/received to/from PC I/F unit 401 is connected to handset unit 407 or to base unit 408.

Base sound output unit 403 delivers voice data that is transmitted from PC terminal 102 and that is received through PC I/F unit 401 and voice input/output switching unit 402 to a speaker (not shown) of base unit 408 when sound input/output switching unit 402 is connected to base unit 408.

Handset sound input unit 404 transmits a sound input from the microphone of handset unit 407 to PC terminal 102 through sound input/output switching unit 402 and PC I/F unit 401 when sound input/output switching unit 402 is connected to handset unit 407.

Handset sound output unit 405 delivers sound data that is transmitted from PC terminal 102 and that is received through PC I/F unit 401 and sound input/output switching unit 402 to a speaker (not shown) of handset unit 407 when sound input/output switching unit 402 is connected to handset unit 407.

Hook switch detection unit 406 detects, with the aid of a hook switch (not shown) mounted in base unit 408, whether handset unit 407 is hooked off or seated on base unit 408, and notifies OS 310 of PC terminal 102 of the state of the hook switch through PC I/F unit 401 when the state of the hook switch changes in state.

FIG. 5 is a diagram showing contents in a storage area for setting data in a setting data storage area for voice call application 301 stored in fixed storage device 209 of PC terminal 102.

Handset hook state 501 stores the state of the hook switch in handset sound source 207 that is connected to PC terminal 102.

Handset destination state 502 stores the state when sound input/output switching unit 402 in handset sound source 207 has switched.

Exchanger calling state 503 stores the state of PC terminal 102, i.e., the state notified by voice exchanger 101 indicating whether a telephone call (conversation) is taking place or not.

Voice data transmission/reception state 504 stores the state of voice line I/F unit 203 in PC terminal 102, indicating whether it is transmitting/receiving voice data to/from voice call line 106.

In-service ringer tone volume setting 505 stores the amount by which ringer tone volume control unit 304 of voice call application 301 increases or decrease the volume when an incoming call arrives at PC terminal 102 while a conversation is occurring.

In-service OS/other application volume setting 506 stores the amount by which voice call application 301 increases or decreases the volume for sound source volume control units 316, 317 of OS 310 when a conversation is occurring at PC terminal 102.

Call sound source setting 507 stores the ID of a sound source that has been instructed by voice call application 301 to transmit/receive voice data to/from voice call line 106.

Incoming call sound source setting 508 stores the ID of a sound source which that has been instructed by voice call application 301 to generate a ringer tone.

Figure 6:
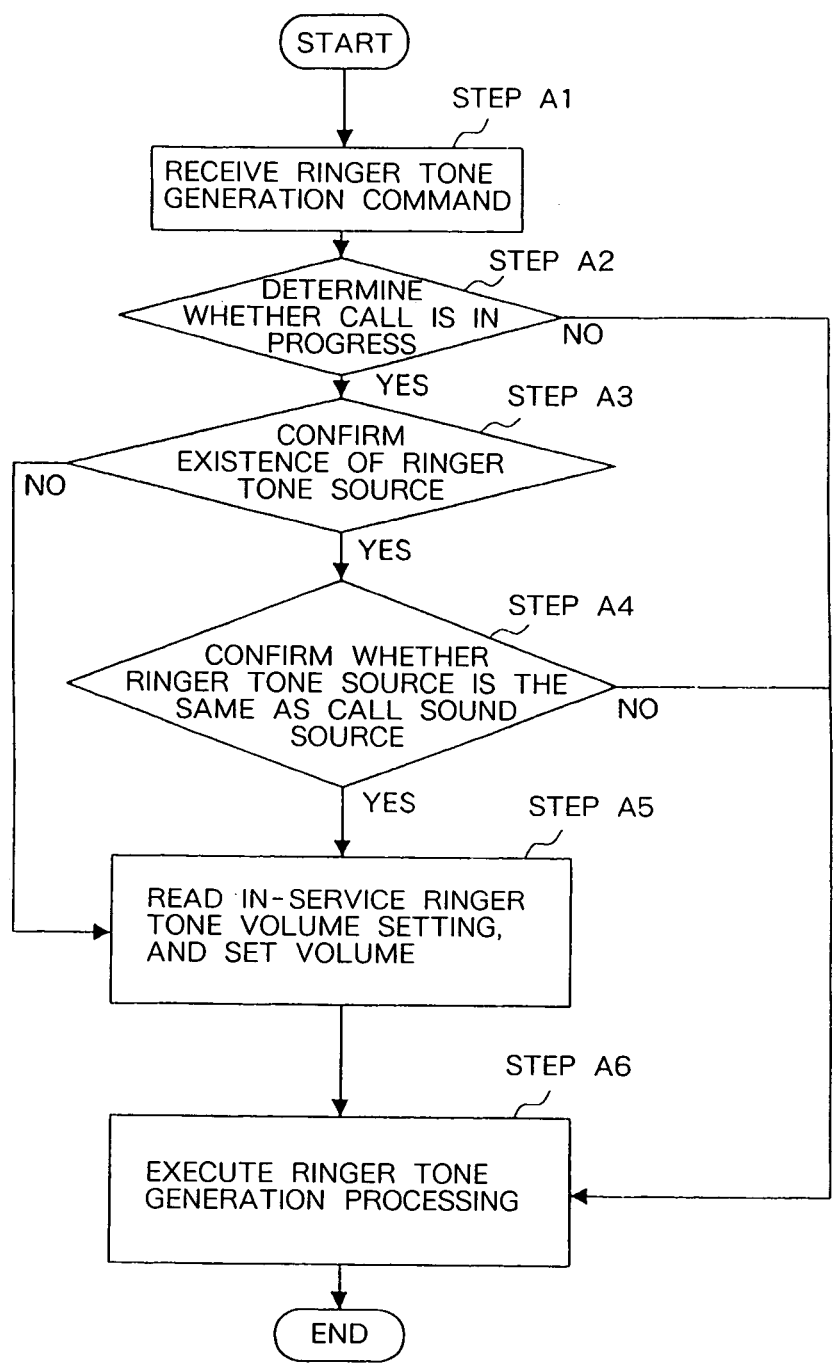
FIG. 6 is a flow chart illustrating the operation of the embodiment illustrated in FIG. 1.
Figure 7:
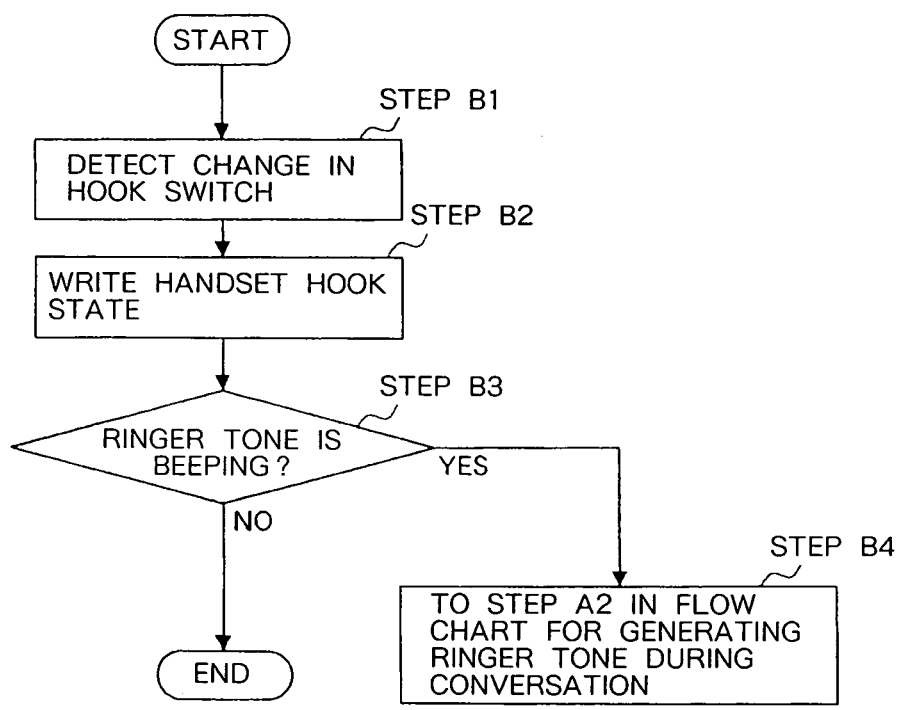
FIG. 7 is a flow chart illustrating the operation of the embodiment illustrated in FIG. 1.

Next, the operation of this embodiment will be described with reference to flow charts illustrated in FIGS. 6 and 7.

A description will be first given of a scenario where it is determined, based on the state of the hook switch in handset sound source 207, whether or not a conversation is occurring at PC terminal 102, and the volume of the ringer tone is decreased to a set value when the ringer tone is generated during the conversation by the same sound source which is used in the conversation.

Assume that handset sound source 207 alone is connected to sound source I/F unit 202, the ID of handset sound source 207 is set in call sound source setting 507, and the ID of handset sound source 207 is also set in ringer tone source setting 508. In addition, assume that a volume reduction value (−5 dB) is set in in-service ringer tone volume setting 505.

Sound input/output switching unit 402 of handset sound source 207 is switched to handset unit 407 by communication control unit 302 through sound source input/output unit 307, sound source control I/F 312, sound source control unit 318, and PC I/F unit 401 upon the start of a call.

PC terminal 102 is in connection with voice call network 104 for making a call using handset sound source 207, so that handset unit 407 is hooked off base unit 408. This state of handset unit 407 is detected by hook switch detection unit 406 (step B1 in FIG. 7), and notified to PC I/F unit 401, sound source I/F unit 202 and CPU 204 of PC terminal 102 and to sound source control unit 318, sound source control I/F unit 312, and communication control unit 320 of OS 310. In response to the received notification of a change in the on-hook state of handset unit 407, communication control unit 320 writes an off-hook state into handset hook state 501 through fixed storage device control unit 314 (step B2 in FIG. 7). Subsequently, it is confirmed that a ringer tone is generated (step B3 in FIG. 7), however, the flow terminates if no ringer tone is generated at this time.

When voice exchanger 101 is notified of an incoming tall from voice communications network 104 to PC terminal 102, voice exchanger 101 transmits a ringer tone generation command to PC terminal 102 through voice call line 106. CPU 204 receives the ringer tone generation command through voice line I/F unit 203, and processes the command in accordance with software running on OS 310, i.e., voice call application 301 stored in memory 205. Specifically, voice line I/F control unit 315 of OS 310 receives the ringer tone generation command, and passes the command to voice line input/output unit 308 of voice call application 301. Voice line input/output unit 308 passes the ringer tone generation command to communication control unit 320 (step A1 in FIG. 6).

Communication control unit 320 reads call sound source setting 507 through fixed storage device control unit 314. Since the handset sound source is currently set in call sound source setting 507, communication control unit 320 reads handset hook state 501 through fixed storage device control unit 314. Communication control unit 310 determines that a call is in progress because handset hook state 501 is in an off-hook state (step A2 in FIG. 6).

Subsequently, communication control unit 320 reads ringer tone source setting 508 through fixed storage device control unit 314, and confirms, through sound source control I/F unit 312 and sound source control unit 318, that a connection has been made between handset sound source 207 and the PC terminal and handset sound source 207 is set as a ringer tone source, i.e., handset sound source 207 is connected to PC terminal 102 (step A3 in FIG. 6).

Subsequently, communication control unit 320 compares read call sound source setting 507 with ringer tone source setting 508 to determine that these settings indicate the same sound source (step A4 in FIG. 6).

Next, communication control unit 320 reads in-service ringer tone volume setting 505 through fixed storage device control unit 314, reads the volume reduction value (−5 dB), and transmits a ringer tone transmission command to ringer tone generation unit 303 together with the volume reduction value. Ringer tone generation unit 303 reads a ringer tone waveform file recorded in fixed storage device 209 through ringer tone file reading unit 302, converts the file into format which permits the ringer tone to be reproduced on OS 310, and sends the converted file to ringer tone volume control unit 304 together with the volume reduction value (step S5 in FIG. 6).

Subsequently, ringer tone volume control unit 304 decreases the received ringer tone volume by the indicated volume reduction value, and transmits the resulting ringer tone waveform data to sound source input/output unit 307 through volume control unit 306. Sound source input/output unit 307 passes the ringer tone waveform data to sound source control I/F 312 to issue a ringer tone generation command. Upon receipt of the ringer tone waveform data through sound source control I/F 312, sound source control unit 318 passes the ringer tone waveform data to handset sound source 207 through sound source I/F unit 202 and PC I/F unit 401. Then, the ringer tone waveform data is passed to handset sound output unit 405 through sound input/output switching unit 402, and the ringer tone is reproduced from the speaker of handset sound source 207 (step A6).

In this embodiment, it is determined at step A2 that a call is in progress, but when the hook switch of the handset sound source is in an on-hook state, it is determined that no call is in progress, in which case the ringer tone generation command from communication control unit 320 is transmitted to volume control unit 304, without including the volume reduction value, to generate the ringer tone at a normal volume at step A6.

Also, in this embodiment, it is determined at step A3 that the ringer tone source exists, but when no ringer tone source exists, processing at step A4 is skipped, and at step A5 onward, the call sound source is instructed to generate the ringer tone at a decreased volume in a similar manner to this embodiment.

Further, in this embodiment, it is determined at step A4 that the ringer tone source is the same as the call sound source, but when the ringer tone source is different from the call sound source, the ringer tone generation command from communication control unit 320 is transmitted to volume control unit 304, without including the volume reduction value, to instruct the ringer tone source to generate the ringer tone at a normal volume at step A6.

Further, in this embodiment, the calling state does not change while the ringer tone is beeping, but if the hook switch state is changed while the ringer tone is beeping, the flow proceeds from processing at step B3 to processing at step B4, followed by execution of processing at step A2. In this way, upon transition to a calling state while the ringer tone is beeping, the ringer tone volume is decreased. After the calling state ends, the ringer tone volume is increased.

In this embodiment configured as described above, even if the state of the sound source for generating the ringer tone in PC terminal 102 changes, a louder ringer tone will not be generated from a sound source which is being used in a conversation, so that the conversation is not hindered by the ringer tone.

Second Embodiment

Next, a second embodiment of the present invention will be described.

In the first embodiment, the value in in-service ringer tone volume setting 505 is a value in which the sound volume changes. Alternatively, the volume may be set to OFF, so that the ringer tone is not generated.

In this scenario, the aforementioned flow is modified at step A6.

Since the indicated volume is OFF, ringer tone volume control unit 304 transmits mute ringer tone waveform data to sound source input/output unit 307 through volume control unit 306. Sound source input/output unit 307 passes the ringer tone waveform data to sound source control I/F 312 to issue a ringer tone generation command. Upon receipt of the ringer tone waveform data through sound source control I/F 312, sound source control unit 318 passes the ringer tone waveform data to handset sound source 207 through sound source I/F unit 202 and PC I/F unit 401. This data is further passed to handset sound output unit 405 through sound input/output switching unit 402 to reproduce the ringer tone from the speaker of the handset, but since the ringer tone is muted, no ringer tone beeps (step A6).

According to the second embodiment, the present invention can also be implemented if the user desires that not even a small ringer tone be emitted from the sound source during a conversation.

Third Embodiment

Next, a third embodiment of the present invention will be described with reference to FIG. 8.

In the first embodiment described above, the on/off state of the hook switch of handset sound source 207 is relied on to determine whether or not a call is in progress. Alternatively, this determination may be made at the destination of handset sound source 207.

Figure 8:
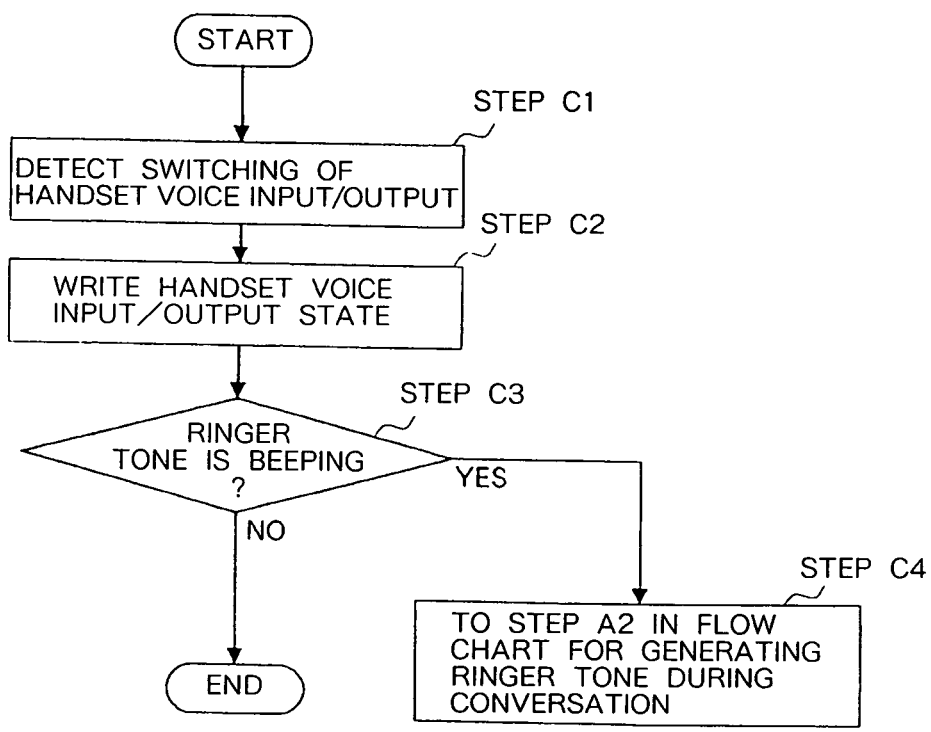
FIG. 8 is a flow chart illustrating the operation according to a third embodiment of the present invention.

In this scenario, processing at steps B1, B2, B3, B4 is modified to the following operations as illustrated in a flow chart of FIG. 8.

Sound input/output switching unit 402 of handset sound source 207 is switched to handset unit 407 by communication control unit 320 through sound source input/output unit 307, sound source control I/F 312, sound source control unit 318, and PC I/F unit 401 upon the start of a call (step C1 in FIG. 8), and this state is written into handset destination state 502 by communication control unit 320 through fixed storage device control unit 315 (step C2 in FIG. 8). Subsequently, it is confirmed whether or not the on/off state of the hook switch has changed while the ringer tone is beeping (step C3 in FIG. 8). When the on/off state of the hook switch is changed while the ringer tone is beeping, the flow proceeds to processing at step C4, followed by the execution of processing at step A2. In this way, when a PC terminal goes into a state in which a telephone conversation is in progress while the ringer tone is beeping, the ringer tone volume is decreased. When this state ends, the ringer tone volume is increased.

In addition, processing at step A2 is modified in the following manner.

Communication control unit 320 reads call sound source setting 507 through fixed storage device control unit 314. Since call sound source setting 507 is currently set to the handset sound source, communication control unit 320 reads handset destination state 502 through fixed storage device control unit 314. Communication control unit 320 determines that a call is in progress because the handset destination is set to the handset unit (step A2).

According to the third embodiment, the present invention can also be implemented even when a used handset sound source does not have a hook switch.

Fourth Embodiment

Next, a fourth embodiment of the present invention will be described with reference to FIG. 9.

Figure 9:
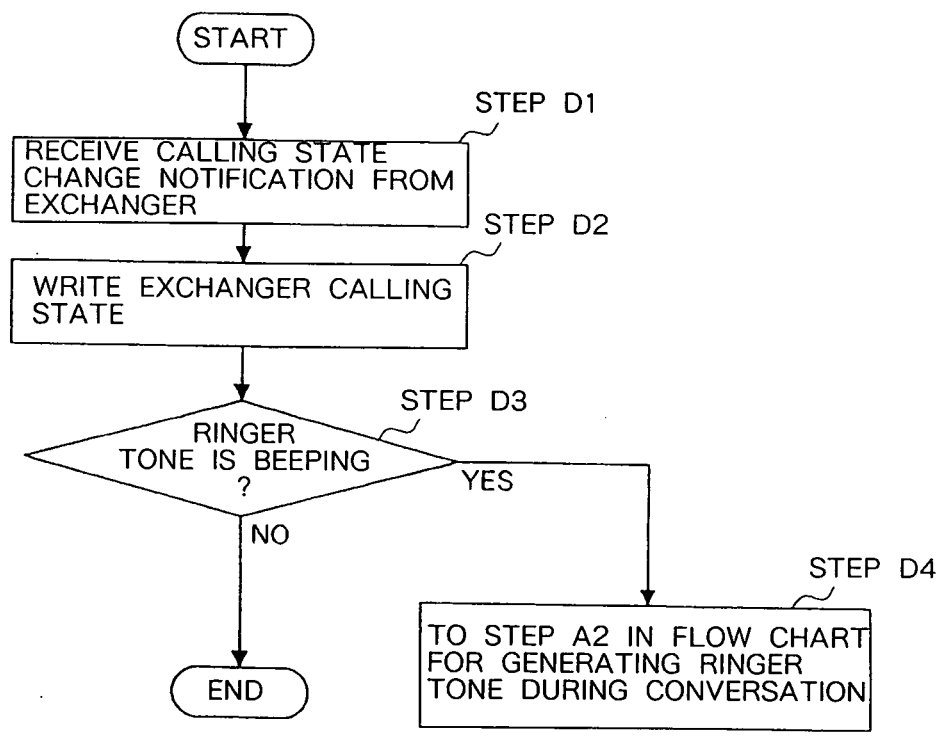
FIG. 9 is a flow chart illustrating the operation according to a fourth embodiment of the present invention.

In this embodiment, an exchanger calling state 503 is relied on to determine whether or not a call is in progress, where processing at steps B1, B2, B3, B4 is modified to the following operations as illustrated in a flow chart of FIG. 9.

When PC terminal 102 receives a call start/end command from voice exchanger 101 through voice line interface unit 203 (step D1 in FIG. 9), communication control unit 320 receives the contents of the command through voice line input/output unit 308 and voice line I/F control unit 305, instructs voice data processing unit 305 to start/end a voice call, and simultaneously writes the calling state into exchanger calling state 503 through fixed storage device control unit 314 (step D2 in FIG. 9). Subsequently, communication control unit 320 confirms whether or not the exchanger calling state is changed while a ringer tone is beeping (step D3 in FIG. 9). When the exchanger calling state is changed while the ringer tone is beeping, the flow proceeds from processing at step D3 to processing at step D4, followed by execution of the processing at step A2. In this way, when PC terminal 102 enters a state in which a call is in progress, while the ringer tone is beeping, the ringer tone volume is decreased. When the telephone conversation ends, the ringer tone volume is increased.

In addition, processing at step A2 is modified in the following manner.

Communication control unit 320 reads exchanger calling state 503 through fixed storage device control unit 314. Communication control unit 320 determines that a call is in progress because a calling state is indicated by read exchanger calling state 503 (step A2).

According to the fourth embodiment, the present invention can also be implemented even when a used handset sound source does not have a hook switch or a sound input/output switching function.

Fifth Embodiment

Next, a fifth embodiment of the present invention will be described with reference to FIG. 10.

Figure 10:
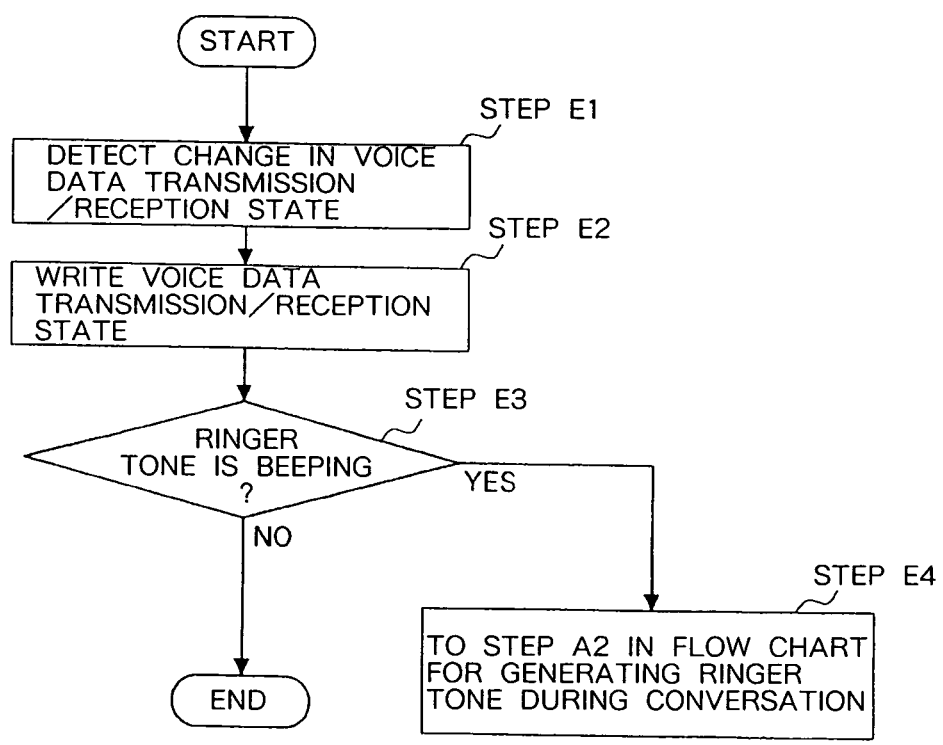
FIG. 10 is a flow chart illustrating the operation according to a fifth embodiment of the present invention.

In this embodiment, the voice data transmission/reception state is relied on to determine whether or not a call is in progress, in which the processing at steps B1, B2, B3, B4 is modified to the following operations as illustrated in a flow chart of FIG. 10.

Communication control unit 320 of PC terminal 102 always monitors a voice data transmission/reception state through voice line input/output unit 308 of voice data processing unit 305 (step E1 in FIG. 10), and writes the monitoring result into voice data transmission/reception state 504 through fixed storage device control unit 314 in accordance with the voice data transmission or reception state (step E2 in FIG. 10). Upon detection of the voice data transmission or reception state at step E1, communication control unit 320 writes an ongoing transmission/reception state into voice data transmission/reception state 504 through fixed storage device control unit 314 at step E2. On the other hand, when no voice data has been transmitted or received for a previously set certain time period at step E1, communication control unit 320 writes a transmission/reception interrupted state into voice data transmission/reception state 504 through fixed storage device control unit 314 at step E2.

The ongoing transmission/reception state occur as well when mute voice data is being transmitted/received. Subsequently, communication control unit 320 confirms whether or not the voice data transmission/reception state has been changed while a ringer tone is beeping (step E3 in FIG. 10). When the voice data transmission/reception state has been changed while the ringer tone is beeping, the flow proceeds to processing at step E4, followed by execution of processing at step A2. In this way, as PC terminal 102 enters a state in which a call is in progress, the ringer tone volume is decreased. When the call in progress ends, the ringer tone volume is increased.

In addition, processing at step A2 is modified in the following manner.

Communication control unit 320 reads voice data transmission/reception state 504 through fixed storage device control unit 314. Communication control unit 320 determines that a call is in progress because an ongoing transmission/reception state is indicated by voice data transmission/reception state 504 (step A2).

According to the fifth embodiment, the present invention can also be implemented when no call start/end signal is supplied from the exchanger, and when a used handset sound source does not have a hook switch or a sound input/output switching function.

Sixth Embodiment

Next, a sixth embodiment of the present invention will be described with reference to FIG. 11.

Figure 11:
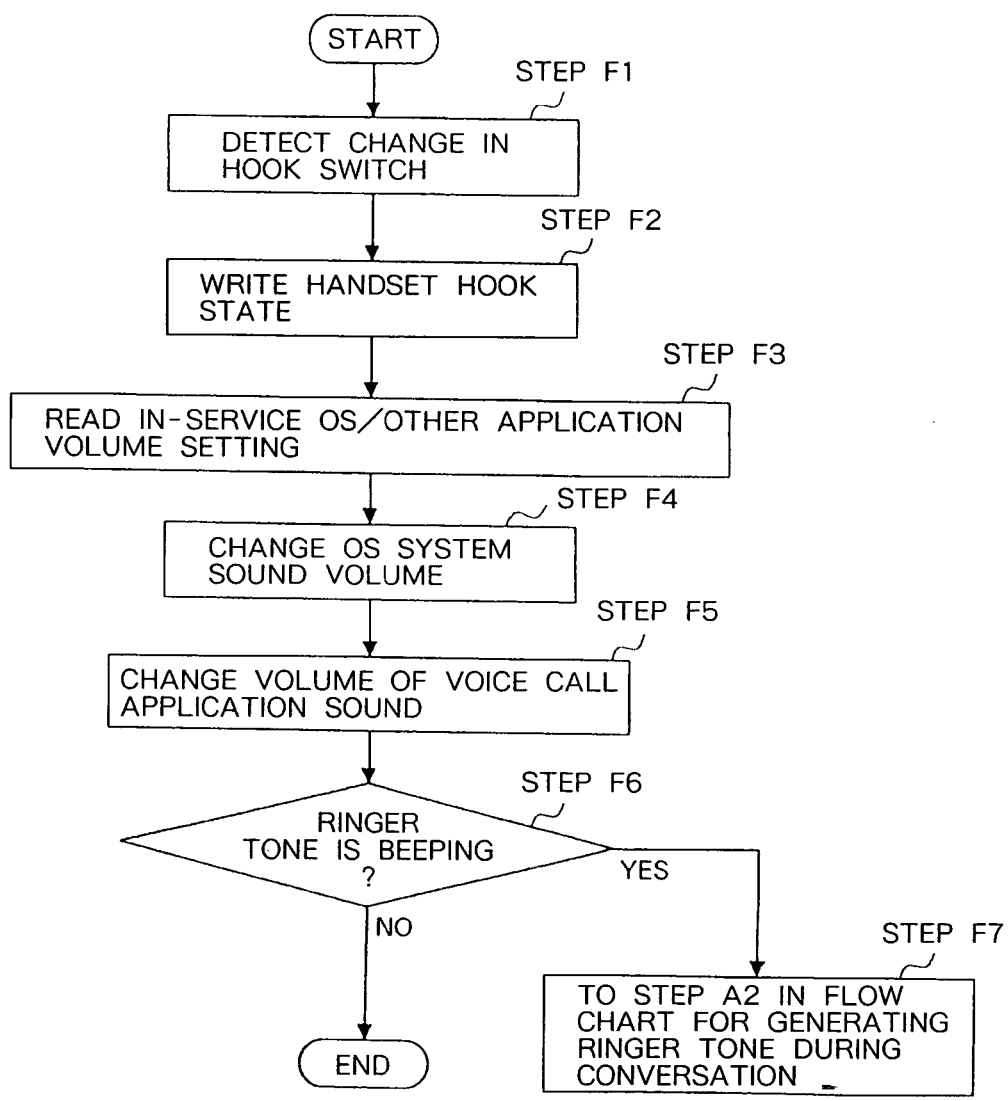
FIG. 11 is a flow chart illustrating the operation according to a sixth embodiment of the present invention.

In this embodiment, when the state of the call in progress is changed, the volume of OS-related sound is completely decreased, and the volume of sound associated with the voice call application and ringer tone is increased by the same amount that the OS-related sound is decreased, where processing at steps B1, B2, B3, B4 is modified to the following operations as illustrated in a flow chart of FIG. 11.

Processing at steps F1, F2 is the same as that at steps B1, B2.

Communication control unit 320 of PC terminal 102 writes an off-hook state into handset hook state 501 through fixed storage device control unit 314, and simultaneously reads in-service OS/other application volume setting 506 (step F3). When handset hook state 501 indicates an off-hook state, communication control unit 320 transmits this value to sound source volume control unit 316 through sound source control I/F 312 associated with a sound source which is set in call sound source setting 507, and completely decreases the volume of sound associated with PC terminal 102, (step F4). Then, communication control unit 320 reverses the sign (plus or minus) of the value in in-service OS/other application volume setting 506, transmits the resulting value to volume control unit 306, and completely increases the volume of the voice call application (step F5).

Processing at steps F6, F7 is the same as that at step B3, B4, respectively.

In the sixth embodiment configured as described above, PC terminal 102 can be additionally provided with a function of decreasing the volume of system sound associated with the OS, or the volume of sound generated by another sound source using application 309, if generated from a sound source during a conversation without affecting at all the volume of voices during the conversation, and the volume of the in-service ringer tone in the foregoing embodiments. Accordingly, the conversation is not affected by sound associated with the OS and other applications, which can leak from a sound source used in the conversation, while a call is in progress.

Seventh Embodiment

Figure 12:
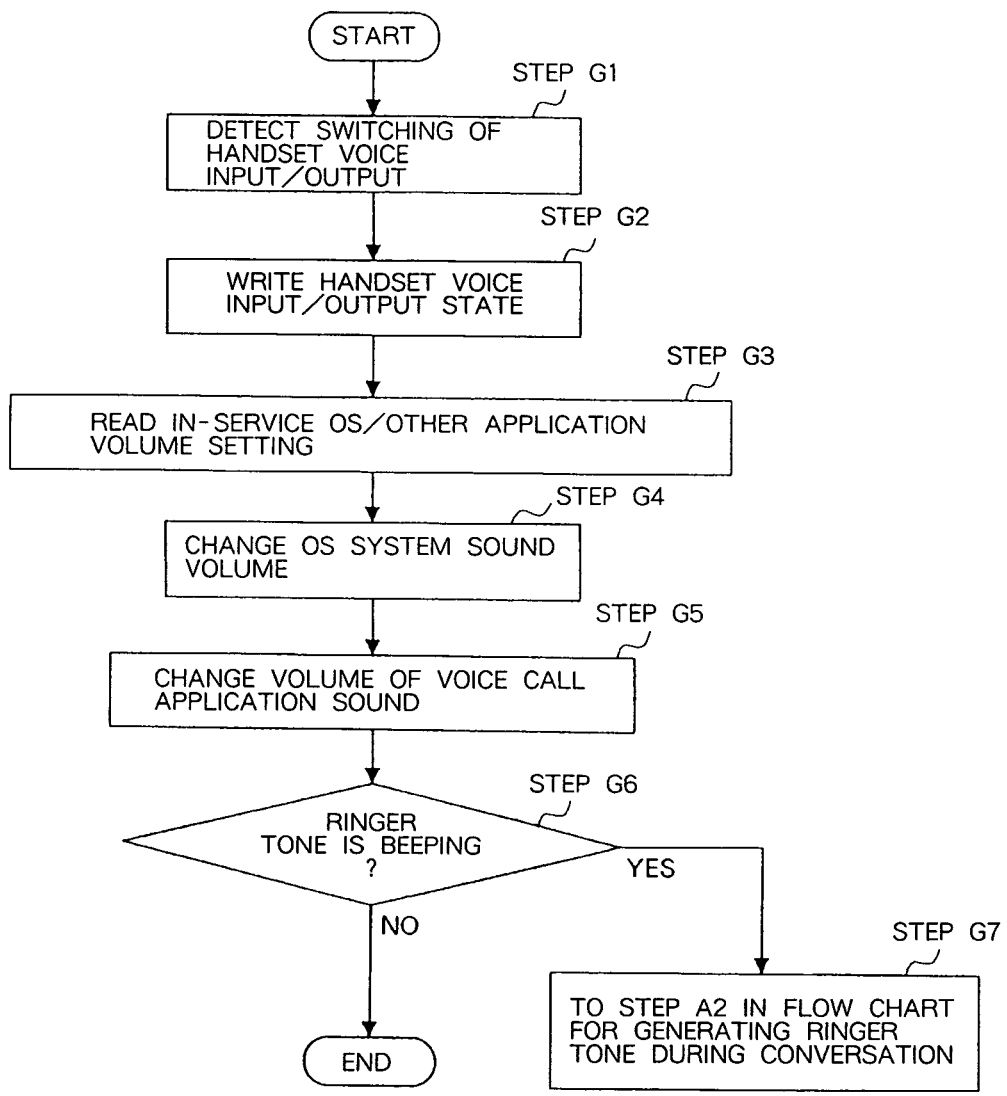
FIG. 12 is a flow chart illustrating the operation according to a seventh embodiment of the present invention.

Next, a seventh embodiment of the present invention will be described with reference to FIG. 12.

In this embodiment, processing at steps F1 and F2 in the sixth embodiment is replaced with processing similar to that at steps C1 and C2 in the third embodiment. FIG. 12 is a flow chart illustrating such a processing operation. Processing performed at steps G1, G2 in FIG. 12 is similar to that at steps C1, C2 in the third embodiment, and processing performed at steps G3-G7 is similar to that at steps F3-F7 in the sixth embodiment.

According to the seventh embodiment, the present invention can also be implemented even when a used handset sound source does not have a hook switch.

Eighth Embodiment

Figure 13:
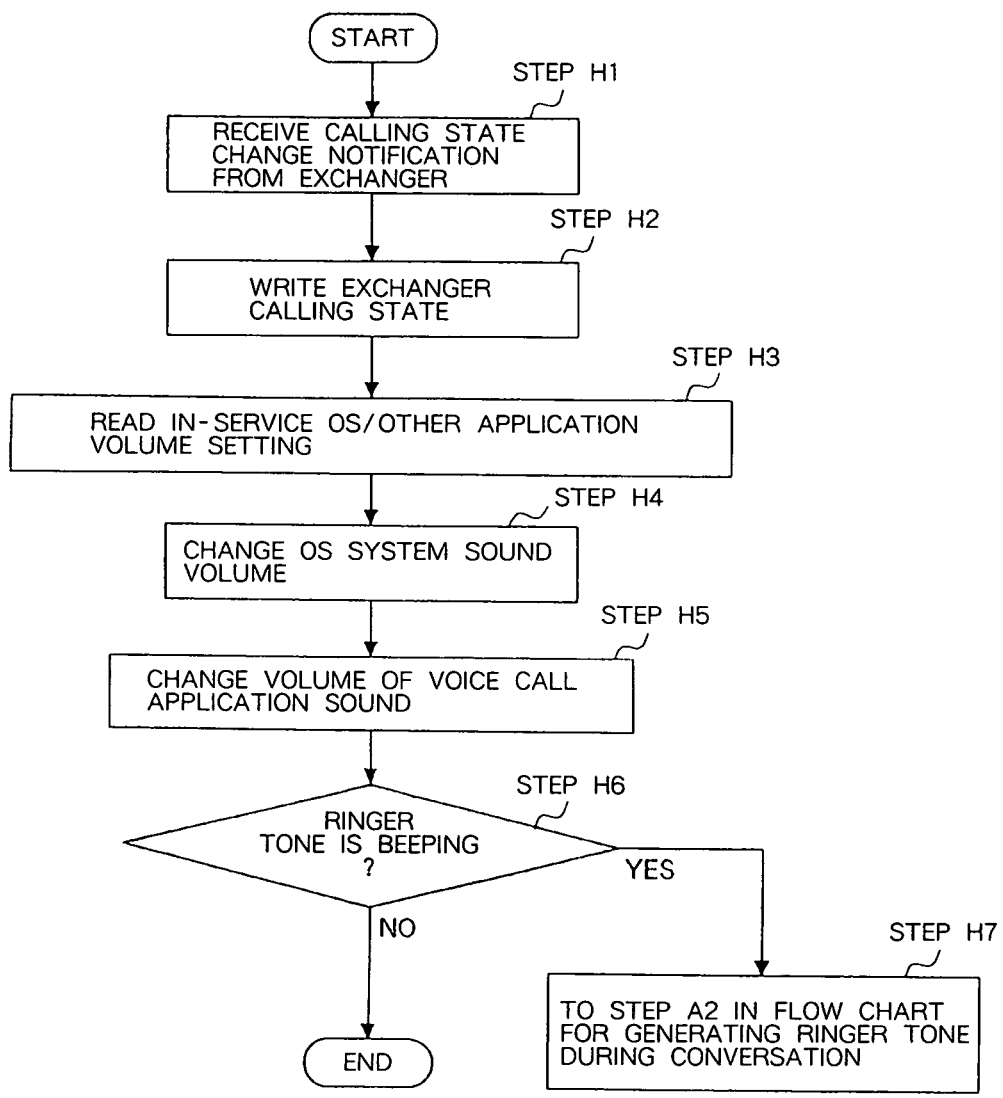
FIG. 13 is a flow chart illustrating the operation according to an eighth embodiment of the present invention.

Next, an eighth embodiment of the present invention will be described with reference to FIG. 13.

In this embodiment, processing at steps F1 and F2 in the sixth embodiment is replaced with processing similar to that at steps D1 and D2 in the fourth embodiment. FIG. 13 is a flow chart illustrating such processing operations. Processing performed at steps H1, H2 in FIG. 13 is similar to that at steps D1, D2 in the fourth embodiment, and processing performed at steps H3-H7 is similar to that at steps F3-F7 in the sixth embodiment.

In the eighth embodiment, the present invention can also be implemented when a used handset sound source does not have a hook switch or a sound input/output switching function.

Ninth Embodiment

Figure 14:
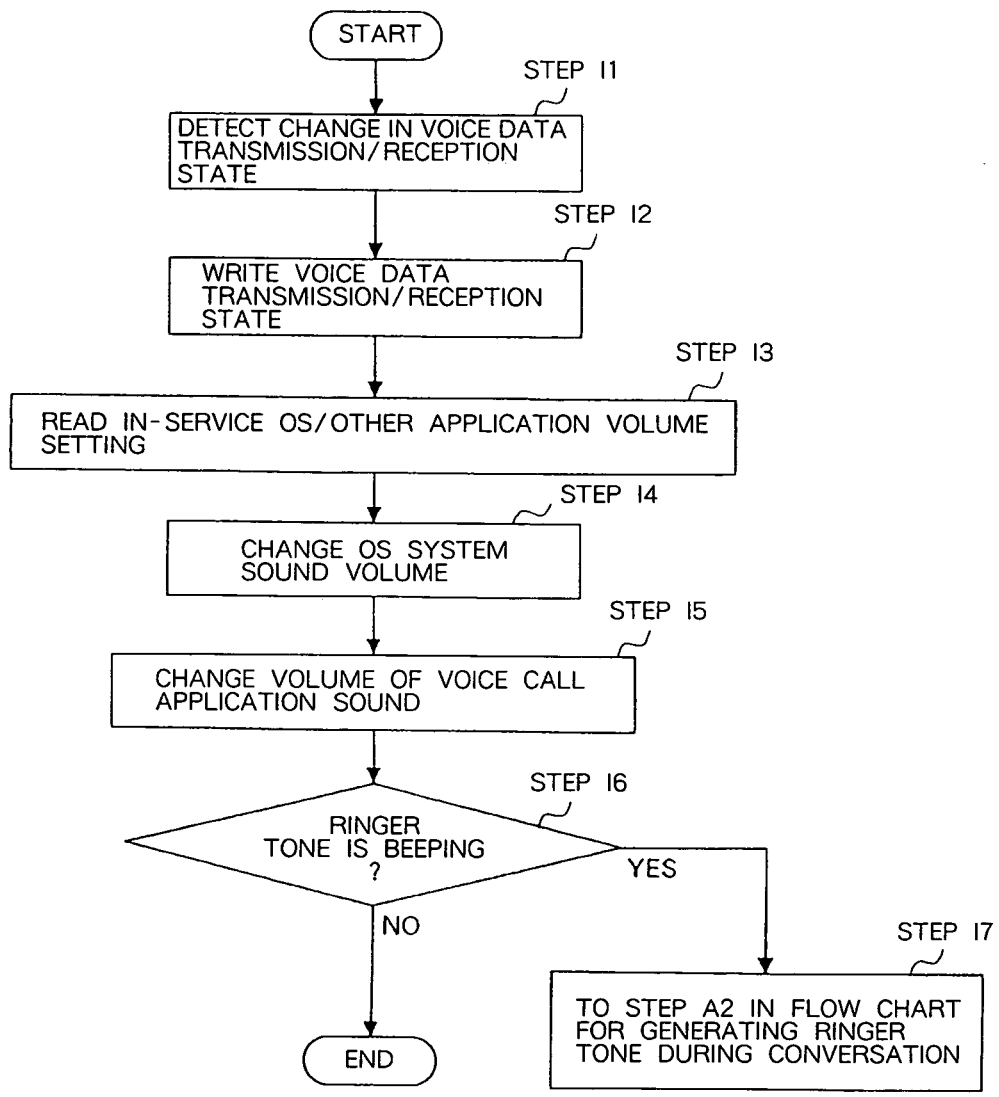
FIG. 14 is a flow chart illustrating the operation according to a ninth embodiment of the present invention.

Next, a ninth embodiment of the present invention will be described with reference to FIG. 14.

In this embodiment, processing at steps F1 and F2 in the sixth embodiment is replaced with processing similar to that at steps E1 and E2 in the fifth embodiment. FIG. 14 is a flow chart illustrating such processing operations. Processing performed at steps I1, I2 in FIG. 14 is similar to that at steps E1, E2 in the fourth embodiment, and processing performed at steps H3-H7 is similar to that at steps F3-F7 in the sixth embodiment.

According to the ninth embodiment, the present invention can also be implemented even when no call start/end signal is supplied from the exchanger, and even when a used handset sound source does not have a hook switch or a sound input/output switching function.

What is claimed is:

1. A voice call system having a personal computer terminal and a voice exchanger connected through a voice communications network and a voice call line, for making a voice call through said personal computer terminal which is controlled by said voice exchanger for reception, origination, and voice communication, said system comprising:
   a handset unit for making a call; and
   a hook switch detection unit for detecting an on-hook/off-hook state of said handset unit,
   wherein said personal computer terminal comprises:
   a sound source interface unit connected to a sound source, said sound source including at least a speaker unit as a sound output unit;
   a fixed storage device for storing setting data indicative of a sound source for use in making a voice call; and
   a communication control unit responsive to a ringer tone generating operation command issued by said voice exchanger, said communication control unit determines whether or not a call is in progress from an on-hook/off-hook state detected by said hook switch detection unit, determines from contents stored in said fixed storage device whether or not a speaker unit for a ringer tone generating operation is a same as a speaker unit for a call, and decreases the volume of a ringer tone or mutes the ringer tone when a call is in progress and when the speaker unit for the ringer tone generating operation is the same as the speaker unit for the call.

2. A voice call system having a personal computer terminal and a voice exchanger connected through a voice communications network and a voice call line, for making a voice call through said personal computer terminal which is controlled by said voice exchanger for reception, origination, and voice communication, said system comprising:
   a handset unit for making a call; and
   a base unit for said handset unit;
   a sound input/output switching unit for connecting sound data transmitted/received to/from a personal computer interface unit connected to said personal computer terminal to said handset unit or to said base unit in accordance with an on-hook/off-hook state of said handset unit,
   wherein said personal computer terminal comprises:
   a sound source interface unit connected to a sound source, said sound source including at least a speaker unit as a sound output unit;
   a fixed storage device for storing setting data indicative of a sound source for use in making a voice call; and
   a communication control unit responsive to a ringer tone generating operation command issued by said voice exchanger, said communication control unit determines whether or not a call is in progress based on the personal computer terminal to which said sound input/output switching unit is connected, determines from contents stored in said fixed storage device whether or not a speaker unit for a ringer tone generating operation is a same as a speaker unit for a call, and decreases the volume of a ringer tone or mutes the ringer tone when a call is in progress and when the speaker unit for the ringer tone generating operation is the same as the speaker unit for the call.

3. A voice call system having a personal computer terminal and a voice exchanger connected through a voice communications network and a voice call line, for making a voice call through said personal computer terminal which is controlled by said voice exchanger for reception, origination, and voice communication, wherein said personal computer terminal comprises:
   a sound source interface unit connected to a sound source, said sound source including at least a speaker unit as a sound output unit;
   a fixed storage device for storing a calling state notified from said voice exchanger and for setting data indicative of a sound source for use in making a voice call; and
   a communication control unit responsive to a ringer tone generating operation command issued by said voice exchanger, said communication control unit determines from contents stored in said fixed storage device whether or not a call is in progress, and determines whether or not a speaker unit for a ringer tone generating operation is a same as a speaker unit for a call, and decreases the volume of a ringer tone or mutes the ringer tone when a call is in progress and when the speaker unit for the ringer tone generating operation is the same as the call speaker unit for the call.

4. A voice call system having a personal computer terminal and a voice exchanger connected through a voice communications network and a voice call line, for making a voice call through said personal computer terminal which is controlled by said voice exchanger for reception, origination, and voice communication, wherein said personal computer terminal comprises:
   a voice data processing unit for transmitting/receiving voice data when a voice call is made;
   a sound source interface unit connected to a sound source, said sound source including at least a speaker unit as a sound output unit;
   a fixed storage device for storing a state during which a call is in progress, notified from said voice exchanged, and for setting data indicative of a sound source for use in making a voice call; and
   a communication control unit responsive to a ringer tone generating operation command issued by said voice exchanger, said communication control unit determines whether or not a call is in progress based on whether or not said voice data processing unit is transmitting/receiving voice data, and determines whether or not a speaker unit for a ringer tone generating operation is a same as a speaker unit for a call, and decreases the volume of a ringer tone or mutes the ringer tone when a call is in progress and when the speaker unit for the ringer tone generating operation is the same as the call speaker unit for the call.

5. The voice call system according to claim 1, wherein: said communication control unit decreases the volume of, or mutes the sound associated with an operating system of said personal computer terminal and the sound associated with another application.

6. The voice call system according to claim 2, wherein: said communication control unit decreases the volume of, or mutes the sound associated with an operating system of said personal computer terminal and the sound associated with another application.

7. The voice call system according to claim 3, wherein: said communication control unit decreases the volume of, or mutes the sound associated with an operating system of said personal computer terminal and the sound associated with another application.

8. The voice call system according to claim 4, wherein: said communication control unit decreases the volume of, or mutes the sound associated with an operating system of said personal computer terminal and the sound associated with another application.

9. The voice call system according to claim 1, wherein the ring tone volume is increased when the call in progress ends.

10. The voice call system according to claim 2, wherein the ring tone volume is increased when the call in progress ends.

11. The voice call system according to claim 3, wherein the ring tone volume is increased when the call in progress ends.

12. The voice call system according to claim 4, wherein the ring tone volume is increased when the call in progress ends.

13. The voice call system according to claim 1, wherein an in-service ringer tone volume setting identifying an amount to decrease the volume of the ringer tone is stored in the fixed storage device.

14. The voice call system according to claim 2, wherein an in-service ringer tone volume setting identifying an amount to decrease the volume of the ringer tone is stored in the fixed storage device.

15. The voice call system according to claim 3, wherein an in-service ringer tone volume setting identifying an amount to decrease the volume of the ringer tone is stored in the fixed storage device.

16. The voice call system according to claim 4, wherein an in-service ringer tone volume setting identifying an amount to decrease the volume of the ringer tone is stored in the fixed storage device.

17. The voice call system according to claim 1, wherein an in-service operating system application volume setting identifying an amount to decrease the volume of an operating system application is stored in the fixed storage device.

18. The voice call system according to claim 2, wherein an in-service operating system application volume setting identifying an amount to decrease the volume of an operating system application is stored in the fixed storage device.

19. The voice call system according to claim 3, wherein an in-service operating system application volume setting identifying an amount to decrease the volume of an operating system application is stored in the fixed storage device.

20. The voice call system according to claim 4, wherein an in-service operating system application volume setting identifying an amount to decrease the volume of an operating system application is stored in the fixed storage device.

* * * * *